(12) United States Patent
Sim et al.

(10) Patent No.: US 10,634,518 B2
(45) Date of Patent: Apr. 28, 2020

(54) RESOLVER

(71) Applicant: LS AUTOMOTIVE TECHNOLOGIES CO., LTD., Gyeonggi-Do (KR)

(72) Inventors: Da-Hee Sim, Gyeonggi-do (KR); Byung-Cheol Na, Gyeonggi-Do (KR); Seong-Wook Lee, Gyeonggi-do (KR); Won-Yong Lee, Seoul (KR); Yeon-Muk Choi, Gyeonggi-do (KR)

(73) Assignee: LS AUTOMOTIVE TECHNOLOGIES CO., LTD., Gyeonggi-Do (KR)

( * ) Notice: Subject to any disclaimer, the term of this patent is extended or adjusted under 35 U.S.C. 154(b) by 245 days.

(21) Appl. No.: 15/769,909

(22) PCT Filed: Dec. 29, 2015

(86) PCT No.: PCT/KR2015/014437
§ 371 (c)(1),
(2) Date: Apr. 20, 2018

(87) PCT Pub. No.: WO2017/082464
PCT Pub. Date: May 18, 2017

(65) Prior Publication Data
US 2018/0313668 A1   Nov. 1, 2018

(30) Foreign Application Priority Data

Nov. 11, 2015   (KR) .......................... 10-2015-0158190

(51) Int. Cl.
*G01D 5/20*   (2006.01)
*G01B 7/30*   (2006.01)
(Continued)

(52) U.S. Cl.
CPC ............. *G01D 5/2073* (2013.01); *G01B 7/30* (2013.01); *G01D 5/20* (2013.01); *H02K 11/225* (2016.01);
(Continued)

(58) Field of Classification Search
CPC .. B60W 2420/506; B62D 5/0481; G01B 7/00; G01B 7/14; G01B 7/30;
(Continued)

(56) References Cited

U.S. PATENT DOCUMENTS 6,346,759 B1 *   2/2002   Suzuki ................... H02K 1/146
310/429
2005/0023921 A1   2/2005   Kobayashi et al.
(Continued)

FOREIGN PATENT DOCUMENTS

JP   1996-178611   7/1996
JP   2005-49183 A   2/2005
(Continued)

OTHER PUBLICATIONS

What-when-how, Sizing and Shaping the Motor (Electric Motors), http://what-when-how.com/electric-motors/sizing-and-shaping-the-motor-electric-motors/ (Year: 2015).*
(Continued)

*Primary Examiner* — Tung X Nguyen
*Assistant Examiner* — Robert P Alejnikov, Jr.
(74) *Attorney, Agent, or Firm* — Harness, Dickey & Pierce, P.L.C.

(57) ABSTRACT

Disclosed is a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein the stator includes a back yoke having a
(Continued)

ring-shaped body, and a plurality of teeth formed at an inner circumference of the back yoke so that the excitation coil and the output coil are wound thereon, wherein the rotor includes a ring-shaped body having a center hole into which the rotary shaft is inserted, and a plurality of salient poles formed at an outer circumference of the ring-shaped body.

8 Claims, 8 Drawing Sheets

(51) Int. Cl.
    *H02K 11/225*     (2016.01)
    *H02K 1/14*     (2006.01)
    *H02K 1/27*     (2006.01)
    *B62D 5/04*     (2006.01)

(52) U.S. Cl.
    CPC ............ *B62D 5/0481* (2013.01); *H02K 1/146* (2013.01); *H02K 1/278* (2013.01); *H02K 2213/03* (2013.01)

(58) Field of Classification Search
    CPC ........ G01B 7/003; G01R 33/02; G01D 5/142; G01D 5/145; G01D 5/20; G01D 5/2033; G01D 5/2073; G01D 5/2241; G01D 5/2046; G01D 5/2053; G06K 7/082; G06K 7/10158; H02K 1/146; H02K 1/278; H02K 11/225; H02K 2213/03; H02K 49/102; H05K 2201/086; Y10S 336/00; Y10S 505/87; E21B 47/02216; G01S 13/88; G01V 3/00; G01V 3/08; G01V 3/15; G01V 3/165; G04C 5/00
    USPC ............................ 324/207.11–207.17, 207.25
    See application file for complete search history.

(56) References Cited

U.S. PATENT DOCUMENTS

| | | |
|---|---|---|
| 2008/0079327 A1 | 4/2008 | Makino |
| 2008/0258585 A1 | 10/2008 | Kataoka et al. |
| 2013/0342040 A1* | 12/2013 | Umemori ............... H02K 37/04 310/49.43 |
| 2014/0159532 A1* | 6/2014 | Kondou ................. H02K 1/276 310/156.53 |
| 2014/0246958 A1 | 9/2014 | Taniguchi |

FOREIGN PATENT DOCUMENTS

| | | |
|---|---|---|
| JP | 2008-268065 A | 11/2008 |
| JP | 2012-117862 A | 6/2012 |
| JP | 2014-163816 A | 9/2014 |
| KR | 10-2015-0042938 A | 4/2015 |

OTHER PUBLICATIONS

Kim et al., Stator Shape Optimization for Electrical Motor Torque Density Improvement, EEE 126, available at https://avestia.com/EECSS2016_Proceedings/files/paper/EEE/126.pdf (Year: 2016).*
Wiak et al., Advanced Computer Techniques in Applied Electromagnetics at 370-374 (IOS Press Oct. 2008) (Year: 2008).*
International Search Report from corresponding PCT Application No. PCT/KR2015/014437 dated Aug. 11, 2016, and it's English translation.

* cited by examiner

| | Width of Salient pole of Rotor (Wr) [mm] | Width of Back yoke of Stator (Wb) [mm] | Width ratio (Wb/Wr) | Maximum measurement error [absolute degree] |
|---|---|---|---|---|
| Case01 | 7.8 | 4.68 | 0.6 | 0.564 |
| Case02 | 7.8 | 4.992 | 0.64 | 0.536 |
| Case03 | 7.8 | 5.07 | 0.65 | 0.512 |
| Case04 | 7.8 | 5.148 | 0.66 | 0.46 |
| Case05 | 7.8 | 5.616 | 0.72 | 0.346 |
| Case06 | 7.8 | 7.8 | 1 | 0.343 |
| Case07 | 7.8 | 15.6 | 2 | 0.329 |
| Case08 | 7.8 | 31.2 | 4 | 0.323 |
| Case09 | 7.8 | 46.8 | 8 | 0.316 |
| Case10 | 7.8 | 93.6 | 12 | 0.316 |

FIG. 5

RESOLVER

CROSS-REFERENCE TO RELATED APPLICATIONS

This application is a National Phase application of PCT Application No. PCT/KR2015/014437, filed on Dec. 29, 2015, which claims the benefit and priority to Korean Patent Application No. 10-2015-0158190, filed Nov. 11, 2015. The entire disclosures of the applications identified in this paragraph are incorporated herein by references.

TECHNICAL FIELD

The present disclosure relates to a resolver, and more particularly, to a resolver for measuring a rotation angle and a rotation speed of a rotating device such as a motor.

BACKGROUND

Generally, a resolver is a kind of sensor for measuring a rotation angle and a rotation speed of a rotating device such as a motor. Recently, the resolver is widely used in various technical fields, particularly to a high-precision control system such as an electric power steering system which demands measurement and control of a rotation angle and a rotation speed with high precision. Therefore, it is needed to accurately figure out and analyze various factors giving an influence on the measurement performance of the resolver and reflect these factors on the design of the resolver in order to minimize a measurement error of the resolver and improve the measurement precision to the maximum.

However, in existing techniques, it is just intended to improve the measurement performance by changing configurations of an excitation coil and an output coil disposed at a stator of a resolver as disclosed in Japanese Unexamined Patent Publication No. 1996-178611, or it is just intended to improve the measurement performance by changing a shape of a rotor of a resolver as disclosed in Japanese Unexamined Patent Publication No. 2005-49183, so a width relation between a back yoke of the stator and the rotor is not considered as a factor giving an influence on the measurement performance of the resolver. In other words, if the back yoke of the stator is designed to have a width smaller than a width of the rotor over a certain level, a magnetic flux of the stator is overcrowded excessively, or a magnetic saturation is generated to disturb a flow of the magnetic flux, thereby deteriorating the measurement performance of the resolver. However, in existing techniques, this drawback is not reflected on the design of the resolver.

Further, in existing techniques, it is not proposed to optimize a relation between a width of the stator and a width of the back yoke of the rotor and reflect the relation on the design of the resolver to facilitate a resolver designing work.

DISCLOSURE

Technical Problem

The present disclosure is designed to solve the problems of the related art, and therefore the present disclosure is directed to providing a resolver which may improve measurement precision, reduce manufacture costs and facilitate a design work of a developer by preventing overcrowded magnetic flux or magnetic saturation.

Technical Solution

In one aspect of the present disclosure, there is provided a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein the stator includes a back yoke having a ring-shaped body, and a plurality of teeth formed at an inner circumference of the back yoke so that the excitation coil and the output coil are wound thereon, wherein the rotor includes a ring-shaped body having a center hole into which the rotary shaft is inserted, and a plurality of salient poles formed at an outer circumference of the ring-shaped body, and wherein the back yoke of the stator and the salient pole of the rotor have a relation satisfying Equation 1 below:

$$Wb \geq 0.66 \times Wr \qquad \text{Equation 1}$$

where Wb represents a width of the back yoke, and Wr represents a width of the salient pole, which is a distance from a peak point of the salient pole to the center hole.

In an embodiment, the back yoke of the stator and the salient pole of the rotor may have a relation satisfying Equation 2 below:

$$0.66 \times Wr \leq Wb \leq 8 \times Wr \qquad \text{Equation 2}$$

where Wb represents a width of the back yoke, and Wr represents a width of the salient pole, which is a distance from the peak point of the salient pole to the center hole.

In an embodiment, the rotor or the stator may be a steel plate laminate formed by laminating magnetic steel plates of a predetermined thickness.

In an embodiment, the teeth of the stator may respectively include a front end having a T shape, and a support portion protruding on the inner circumference of the back yoke to support the front end, the excitation coil or the output coil being wound on the support portion.

In another aspect of the present disclosure, there is also provided a resolver, which includes a stator having at least one excitation coil and at least one output coil and a rotor disposed at a center space in the stator with a predetermined gap from the stator, the rotor rotating based on a rotary shaft to change a gap permeance with respect to the stator, wherein the stator includes a back yoke having a ring-shaped body, and a plurality of teeth formed at an inner circumference of the back yoke so that the excitation coil and the output coil are wound thereon, wherein the rotor includes a ring-shaped body having a center hole into which the rotary shaft is inserted, and a plurality of salient poles formed at an outer circumference of the ring-shaped body, and wherein the back yoke of the stator and the salient pole of the rotor have a relation satisfying Equation 3 below:

$$Wb \geq 0.72 \times Wr \qquad \text{Equation 3}$$

where Wb represents a width of the back yoke, and Wr represents a width of the salient pole, which is a distance from a peak point of the salient pole to the center hole.

In an embodiment, the back yoke of the stator and the salient pole of the rotor may have a relation satisfying Equation 4 below:

$$0.72 \times Wr \leq Wb \leq 1 \times Wr \qquad \text{Equation 4}$$

where Wb represents a width of the back yoke, and Wr represents a width of the salient pole, which is a distance from the peak point of the salient pole to the center hole.

In an embodiment, the rotor or the stator may be a steel plate laminate formed by laminating magnetic steel plates of a predetermined thickness.

In an embodiment, the teeth of the stator may respectively include a front end having a T shape, and a support portion protruding on the inner circumference of the back yoke to support the front end, the excitation coil or the output coil being wound on the support portion.

Advantageous Effects

According to the present disclosure, since a ratio relation between a width of a back yoke of a stator and a salient pole of a rotor is optimized in a resolver, it is possible to prevent overcrowded magnetic flux or magnetic saturation at the resolver, improve measurement precision and reduce manufacture costs without unnecessarily increasing a size or weight of the resolver.

In addition, since a width of the back yoke of the stator and a width of the salient pole of the rotor are considered as a kind of parameter and a numerical range for optimizing a width ratio between them is provided to be reflected on the design of the resolver, it is possible to facilitate a design work for the resolver and prevent a design error.

Further, it would be obviously understood from the following description by those skilled in the art that the embodiments according to the present disclosure can also solve various technical objects not mentioned above.

BRIEF DESCRIPTION OF THE DRAWINGS

FIG. 5 is a table showing maximum measurement errors according to a width ratio between the salient pole of the rotor and the back yoke of the stator.

BEST MODE

Hereinafter, embodiments of the present disclosure will be described in detail with reference to the accompanying drawings in order to clearly explain solutions to the technical objects of the present disclosure. However, in the present disclosure, any explanation of the prior art may be omitted if it is regarded to render the subject matter of the present disclosure vague. Also, the terms used herein are defined in consideration of functions in the present disclosure and can be varied depending on the intention of a designer, a manufacturer or the like or according to custom. Therefore, the terms should be defined based on the overall disclosure of the specification.

Figure 1:
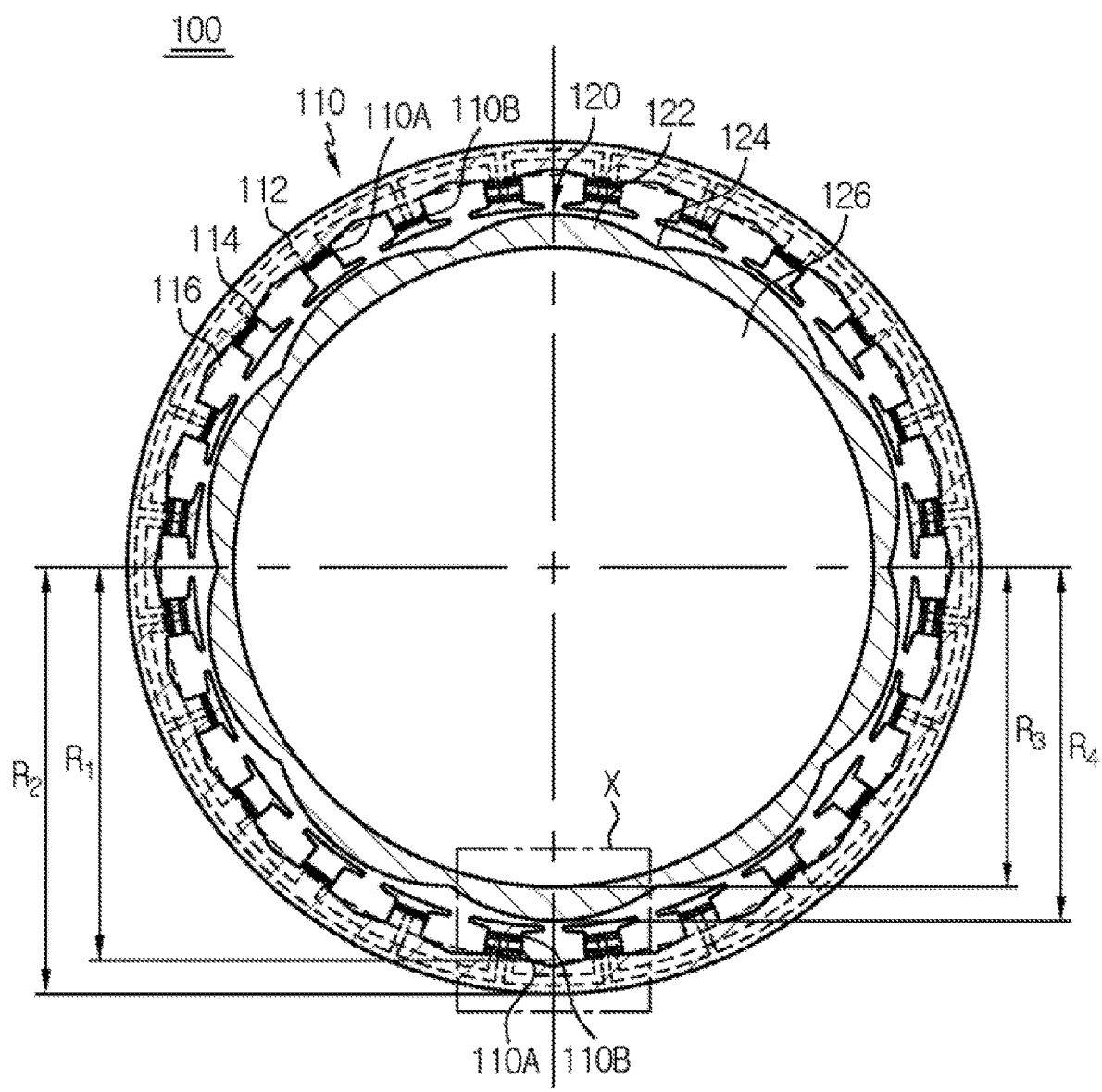
FIG. 1 is a cross-sectional view showing a resolver according to an embodiment of the present disclosure.

FIG. 1 is a cross-sectional view showing a resolver according to an embodiment of the present disclosure.

As shown in FIG. 1, a resolver 100 includes a stator 110 and a rotor 120. The stator 110 has an annular structure as a whole, and at least one excitation coil (110A) and at least one output coil (110B) are disposed at an inner circumference of the resolver 100. Recently, a stator 110 having a one-phase excitation coil and two-phase output coils is widely used. This stator 110 may include a back yoke 112 forming a ring-shaped body of the stator 110 and a plurality of teeth 114 formed at an inner circumference of the back yoke 112. Between teeth of the stator 110, a slot 116 is formed to accommodate a coil, and the excitation coil (110A) and the output coil (110B) are respectively wound on the teeth 114 and disposed in the slots 116. In this case, the teeth 114 of the stator 110 may respectively include a front end 114a having a T shape, and a support portion 114b protruding on the inner circumference of the back yoke 112 to support the front end 114a, so that an excitation coil or an output coil is wound thereon.

The rotor 120 has a shape corresponding to the stator 110, and the rotor 120 is disposed at a center space in the stator 110 with a predetermined gap from the stator 110 to rotate based on a rotary shaft. In this case, the rotor 120 cooperates with the stator 110 to change a gap permeance with respect to the stator 110. For this, the rotor 120 may include a ring-shaped body having a center hole 126 into which the rotary shaft is inserted, a plurality of salient poles 122 formed at an outer circumference of the ring-shaped body, and a connection unit 124 for connecting the salient poles to each other. For example, when the resolver is applied to an electric power steering device, the rotor 120 may be compressively inserted through the center hole 126 into an end of a shaft of a motor assembled to the electric power steering device. In addition, the stator 110 or the rotor 120 may be made of a steel plate laminate formed by laminating a plurality of ferromagnetic steel plates of a predetermined thickness or formed with a single ferromagnetic steel plate of a predetermined thickness.

Meanwhile, if an excitation voltage is applied to the excitation coil (110A) disposed at the stator 110 and also the rotor 120 rotates based on the rotary shaft coupled to a center hole 126 thereof, the rotor 120 changes a gap permeance with respect to the stator 110 by means of the salient poles 122 and the connection portion 124. As a result, voltage signals of sin and cos waveforms are output through the output coil (110B) of the stator 110. The resolver 100 measures a rotation angle, a rotation speed or the like of the rotary shaft by using these output signals.

In this case, if the back yoke 112 of the stator 110 is designed to have a width smaller than a width of the rotor 120 over a certain level, the magnetic flux path is narrowed, and thus a magnetic flux passing through the back yoke 112 is excessively overcrowded or magnetic saturation is generated to disturb a flow of the magnetic flux, thereby resultantly deteriorating the measurement performance of the resolver. In addition, the back yoke 112 of the stator 110 is designed to have a width greater than a width of the rotor 120 over a certain level, the measurement performance is not improved greatly, but a product size is unnecessarily increased, and manufacture costs are also increased.

Therefore, the resolver 100 according to the present disclosure is designed by applying an optimized width ratio between the back yoke 112 of the stator 110 and the rotor 120.

Figure 2:
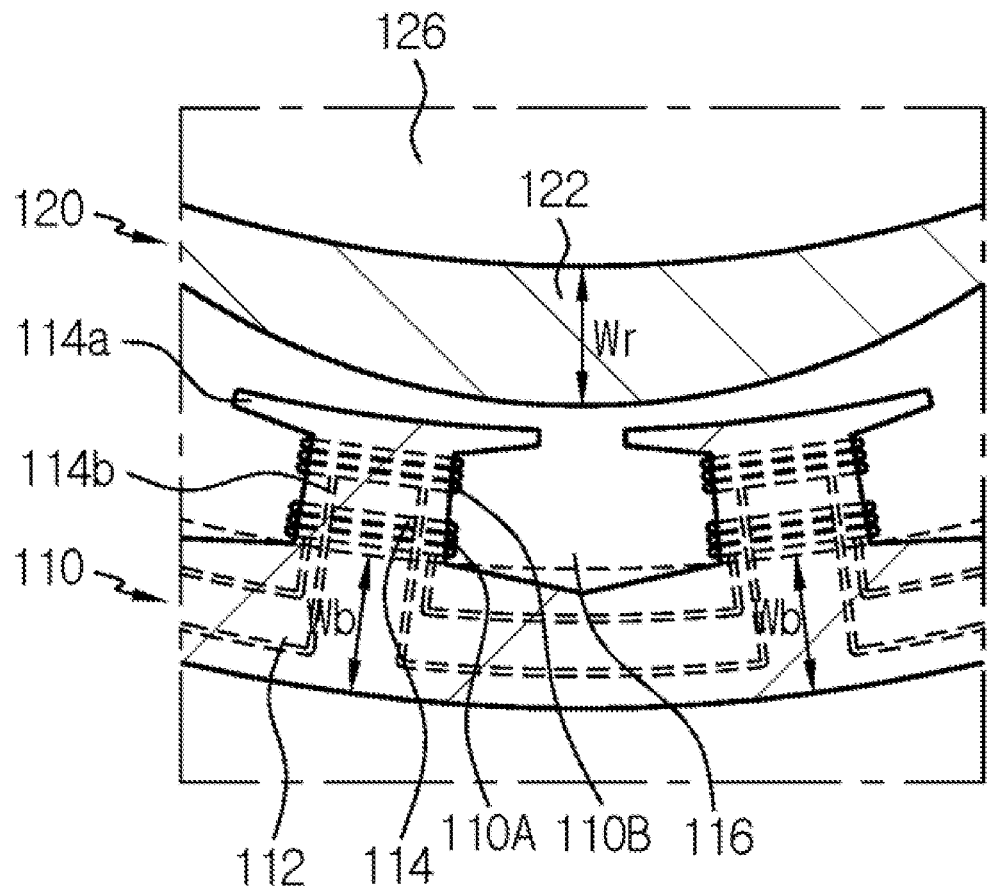
FIG. 2 is an enlarged view showing a portion X of FIG. 1.

FIG. 2 is an enlarged view showing a portion X of FIG. 1.

Referring to FIG. 2 together with FIG. 1, in the present disclosure, the width (Wb) of the back yoke of the stator 110 and the width (Wr) of the salient pole, which corresponds to a maximum width of the rotor 120, are considered as parameters giving an influence on the measurement performance of the resolver and then a relation between them is optimized, thereby improving the measurement performance of the resolver.

Here, the width (Wb) of the back yoke is defined as a value (R2−R1) obtained by subtracting an inner radius (R1) of the back yoke 112 from an outer radius (R2) of the back yoke 112. In other words, the width (Wb) of the back yoke may be defined as in Equation 1 below.

$$Wb = R2 - R1 \qquad \text{Equation 1}$$

Here, Wb represents a width of the back yoke 112, R1 represents an inner radius of the back yoke 112, and R2 represents an outer radius of the back yoke 112. At this time, the inner radius (R1) of the back yoke 112 corresponds to a radius of a virtual circle connecting border lines between the back yoke 112 and the teeth 114.

In addition, the width (Wr) of the salient pole may be defined as a value (R4−R3) obtained by subtracting an inner radius (R3) of the rotor 120 from a maximum outer radius (R4) of the rotor 120. In other words, the width (Wr) of the salient pole may be defined as in Equation 2 below.

$$Wr = R4 - R3 \qquad \text{Equation 2}$$

Here, Wr represents a width of the salient pole, R3 represents an inner radius of the rotor 120, and R4 represents a maximum outer radius of the rotor 120. At this time, the maximum outer radius (R4) of the rotor 120 corresponds to a radius of a virtual circle connecting peak points of the salient poles 122, and the inner radius (R3) of the rotor 120 corresponds to a radius of the center hole 126. Therefore, the width (Wr) of the salient pole may also be defined as a shortest distance from the peak point of the salient pole 122 of the rotor 120 to the center hole 126.

The resolver according to an embodiment of the present disclosure is designed so that a ratio (Wb/Wr) of the width (Wb) of the back yoke to the width (Wr) of the salient pole has a predetermined value of 0.66 or above. In other words, a relation between the width (Wr) of the salient pole and the width (Wb) of the back yoke may be expressed as in Equation 3 below.

$$Wb \geq 0.66 \times Wr \qquad \text{Equation 3}$$

Here, Wb represents a width of the back yoke, and Wr represents a width of the salient pole.

At this time, if the width (Wb) of the back yoke is smaller than 0.66 times of the width (Wr) of the salient pole, the magnetic flux generated at the teeth 114 of the stator 110 is easily saturated at the back yoke 112, and interference is generated between magnetic fluxes to increase an measurement error of the resolver. Therefore, in order to ensure the measurement error of the resolver to be lower than ±0.5° which is a maximum allowable limit demanded in the precise measurement field, the width (Wb) of the back yoke should be 0.66 times or above of the width (Wr) of the salient pole. As described above, according to an embodiment of the present disclosure, the back yoke 112 of the stator 110 may be designed to have a width equal to or greater than 0.66 times of the width (Wr) of the salient pole.

Meanwhile, if the width (Wb) of the back yoke is greater than 8 times of the width (Wr) of the salient pole, the measurement precision of the resolver is not substantially increased, but a product size is unnecessarily increased, and manufacture costs are increased to deteriorate economic feasibility. Therefore, the resolver according to an embodiment of the present disclosure may be designed so that the ratio (Wb/Wr) of the width (Wb) of the back yoke to the width (Wr) of the salient pole is in the range of 0.66 to 8. In other words, a relation between the width (Wr) of the salient pole and the width (Wb) of the back yoke may be expressed as in Equation 4 below.

$$0.66 \times Wr \leq Wb \leq 8 \times Wr \qquad \text{Equation 4}$$

Here, Wb represents a width of the back yoke, and Wr represents a width of the salient pole.

As described above, according to an embodiment of the present disclosure, it is desirable in view of measurement precision and economic feasibility that the back yoke 112 of the stator 110 is designed to have a width corresponding to 0.66 to 8 times of the width (Wr) of the salient pole of the rotor 120.

In addition, the resolver according to another embodiment of the present disclosure may be designed so that the ratio (Wb/Wr) of the width (Wb) of the back yoke to the width (Wr) of the salient pole has a predetermined value of 0.72 or above. In other words, a relation between the width (Wr) of the salient pole and the width (Wb) of the back yoke may be expressed as in Equation 5 below.

$$Wb \geq 0.72 \times Wr \qquad \text{Equation 5}$$

Here, Wb represents a width of the back yoke, and Wr represents a width of the salient pole.

If the width (Wb) of the back yoke is designed to be 0.72 times or above of the width (Wr) of the salient pole, the maximum measurement error of the resolver decreases to 0.35° or below, which allows high precision of the resolver.

Meanwhile, if the width (Wb) of the back yoke is greater than the width (Wr) of the salient pole, even though a product size becomes greater and manufacture costs increase, the measurement performance of the resolver is not improved greatly, thereby deteriorating product efficiency.

Therefore, the resolver according to another embodiment of the present disclosure may be designed so that the ratio (Wb/Wr) of the width (Wb) of the back yoke to the width (Wr) of the salient pole is in the range of 0.72 to 1. In other words, a relation between the width (Wr) of the salient pole and the width (Wb) of the back yoke may be expressed as in Equation 6 below.

$$0.72 \times Wr \leq Wb \leq 1 \times Wr \qquad \text{Equation 6}$$

Here, Wb represents a width of the back yoke, and Wr represents a width of the salient pole.

As described above, if the width (Wb) of the back yoke is designed to be 0.72 to 1 times of the width (Wr) of the salient pole, high precision having a maximum measurement error of 0.35° or below may be ensured, and also a small produce size and reduced manufacture costs may be obtained.

Hereinafter, the measurement performance of the resolver according to the width ratio between the salient pole of the rotor and the back yoke of the stator will be verified using an experimental example as follows.

Figure 3:
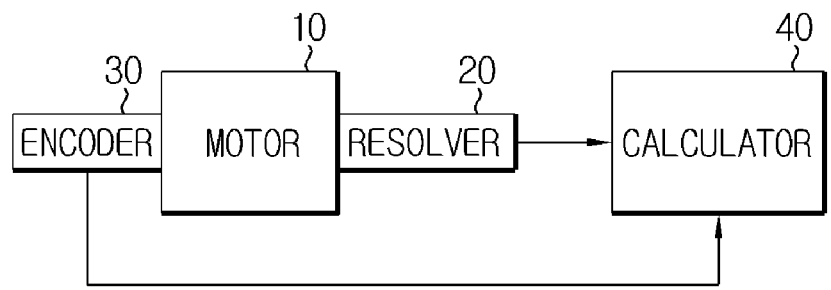
FIG. 3 shows an experiment environment of a resolver according to an embodiment of the present disclosure.

FIG. 3 shows an experiment environment of a resolver according to an embodiment of the present disclosure.

As shown in FIG. 3, in this experimental example, a resolver sample 20 according to an embodiment of the present disclosure was coupled to one end of a rotary shaft of a motor 10, also an encoder 30 was coupled to the other end of the rotary shaft of the motor 10, and then output waveforms of the resolver sample 20 and the encoder 30 were analyzed by means of a calculator 40 to measure an error of the resolver sample 20.

Preparation of a Resolver Sample

A plurality of resolver samples having a rotor having salient poles with a width (Wr) of 7.8 mm and a stator having a back yoke with a width (Wb) so that a ratio (Wb/Wr) of the width (Wb) of the back yoke to the width (Wr) of the salient pole is 0.6 to 12 were prepared. The stator and the rotor of each sample were prepared by laminating ferromagnetic steel plates with a thickness of 0.5 mm in order to minimize a loss such as an iron loss. In addition, the stator was prepared to have 24 teeth, and the rotor was prepared to have 10 salient poles.

Measurement of Errors

Experiment conditions were set have an experiment temperature of 24.5° C., an applied voltage of 7 Vrms, a frequency of 10 kHz, and a rotation speed of 60 rpm at the rotor, and other experiment conditions than the width ratio (Wb/Wr) were maintained consistently among the resolver sample. While driving the rotary shaft of the motor 10, a rotation angle profile of the resolver sample 20 was calculated by means of the calculator 40, and the rotation angle profile of the resolver sample 20 was compared with a rotation angle profile of the encoder 30 to calculate a measurement error of each sample. In addition, a maximum allowable error of the resolver aimed in this experimental example was set to be ±0.5°. The resolver having measurement performance satisfying the maximum allowable error of ±0.5° may be applied to various precise control systems, thereby ensuring versatile application together with measurement precision.

FIGS. 4a, 4b, 4c, 4d and 4e are graphs schematically showing a measurement error according to a width ratio (Wb/Wr) between the salient pole of the rotor and the back yoke of the stator.

Figure 4A:
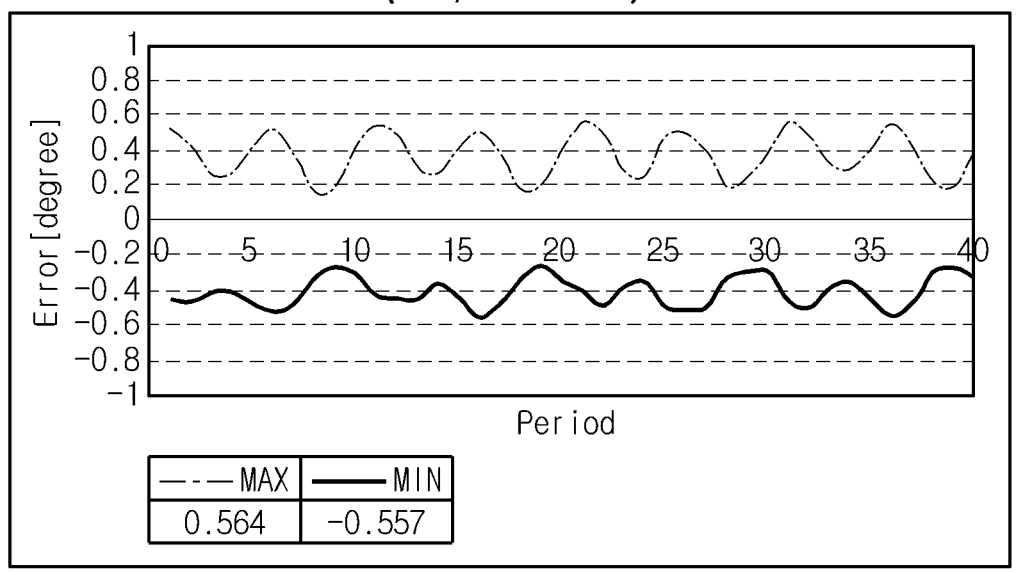
FIGS. 4a to 4e are graphs schematically showing a measurement error according to a width ratio between a salient pole of a rotor and a back yoke of a stator.
Figure 4A:
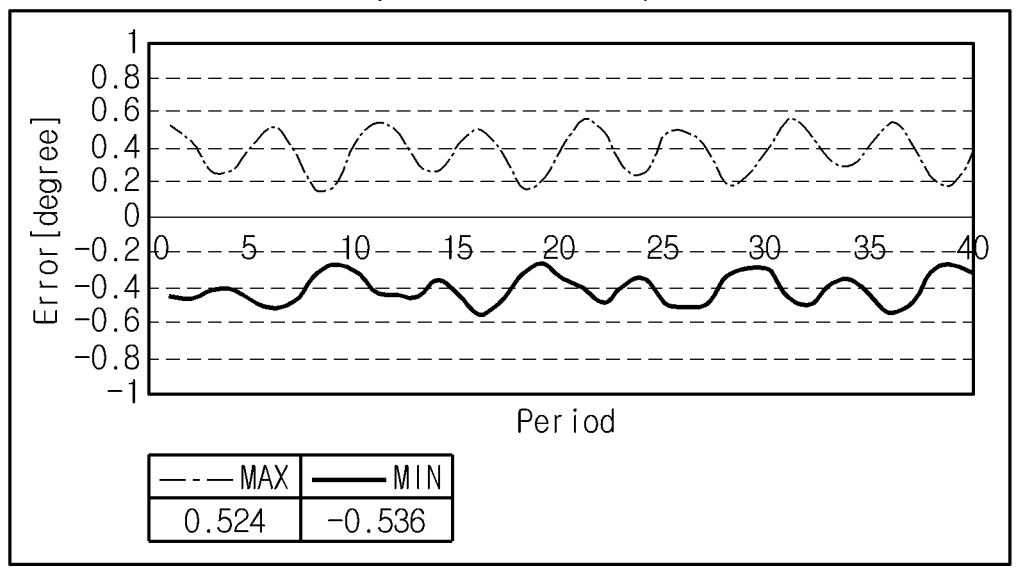

First, referring to FIG. 4a, if the width ratio (Wb/Wr) of the back yoke to the width of the salient pole is 0.6 (Case 01), it may be found that as the rotor keeps rotating, a measurement error varies between a maximum value of 0.564° and a minimum value of −0.557°, and a maximum measurement error, which is an absolute value, reaches 0.564°. In addition, if the width ratio (Wb/Wr) is 0.64 (Case 02), it may be found that as the rotor keeps rotating, a measurement error varies between a maximum value of 0.524° and a minimum value of −0.536°.

Figure 4B:
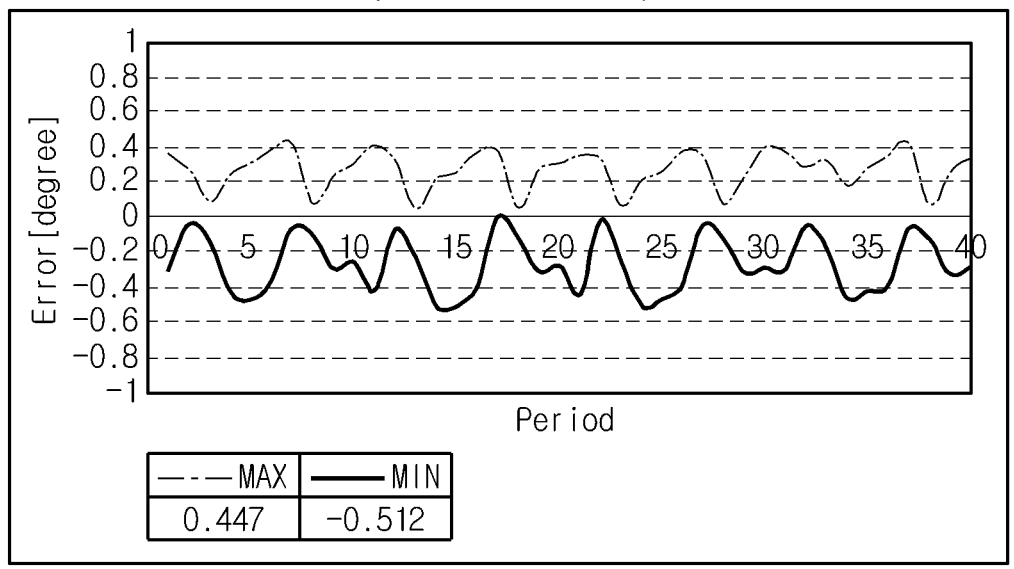
Figure 4B:
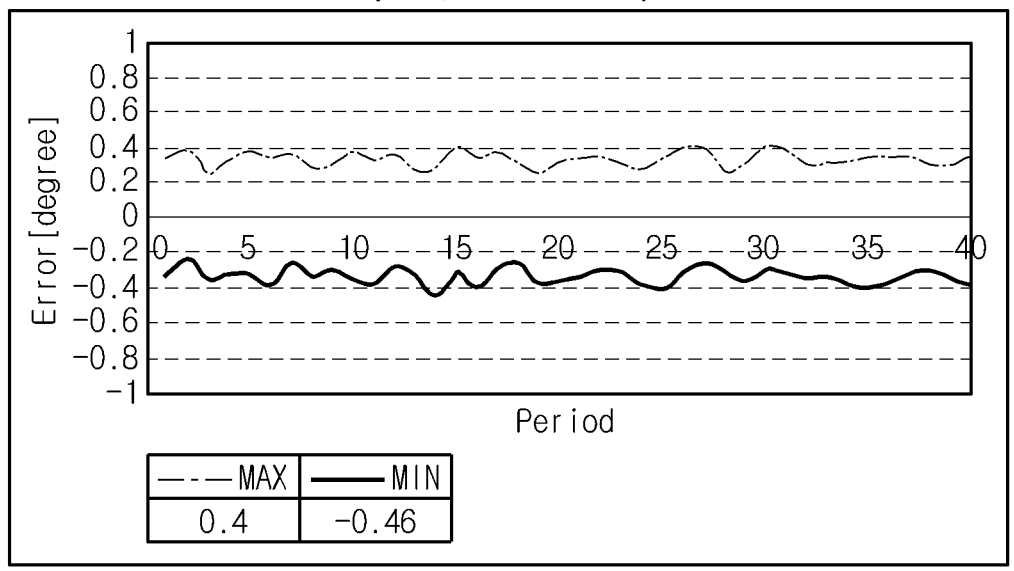

Also, referring to FIG. 4b, if the width ratio (Wb/Wr) is 0.65 (Case 03), it may be found that as the rotor keeps rotating, a measurement error varies between a maximum value of 0.447° and a minimum value of −0.512°. In other words, if the width ratio (Wb/Wr) is 0.65 (Case 03), the maximum value of the measurement error is within an allowable error range, but the minimum value is beyond the allowable error range, undesirably.

Meanwhile, referring to FIG. 4b, if the width ratio (Wb/Wr) reaches 0.66 (Case 04), it may be found that as the rotor keeps rotating, a measurement error varies between a maximum value of 0.4° and a minimum value of −0.46°, and the maximum measurement error becomes 0.46°, which is lower than the maximum allowable error of 0.5°.

Figure 4C:
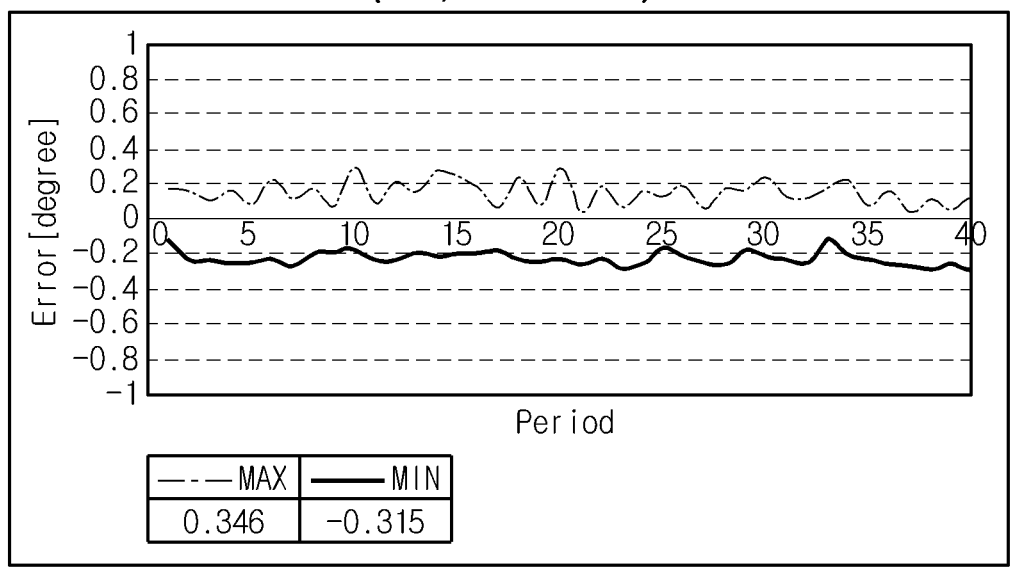
Figure 4C:
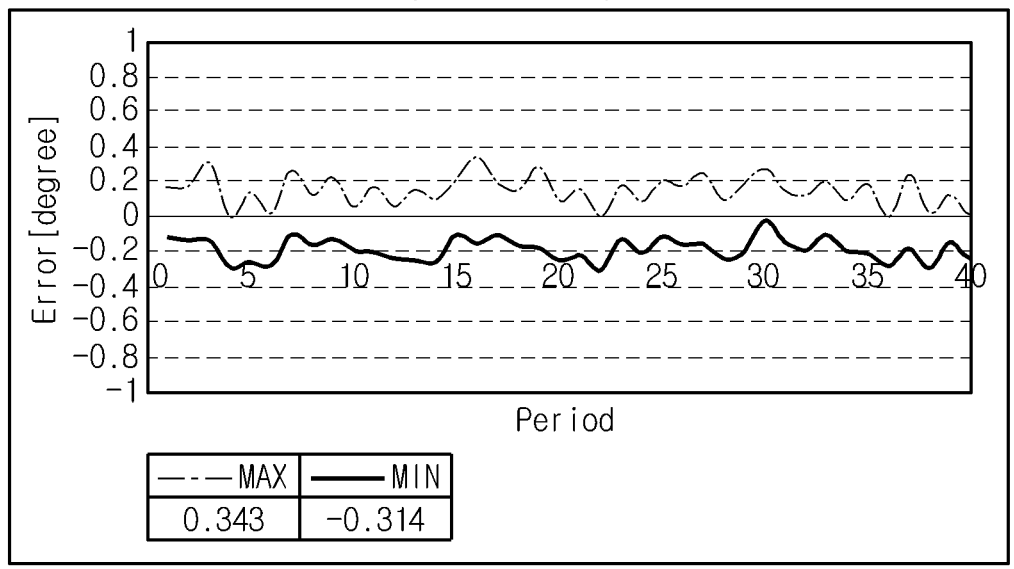

In addition, referring to FIG. 4c, if the width ratio (Wb/Wr) of the back yoke to the salient pole is 0.72 (Case 05) and 1 (Case 06), the maximum measurement error becomes 0.346° and 0.343°, respectively, which ensures high precision.

Figure 4D:
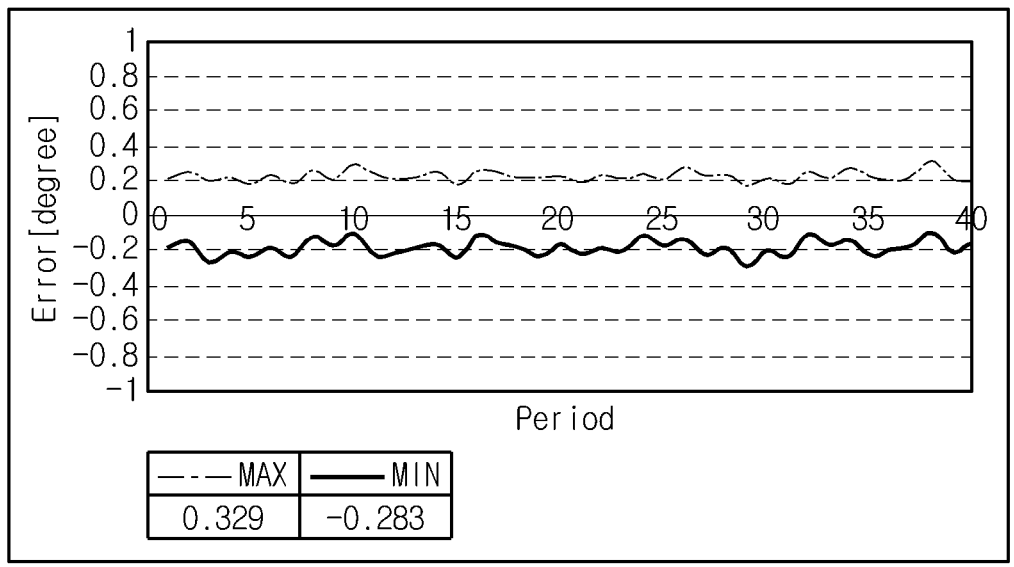
Figure 4D:
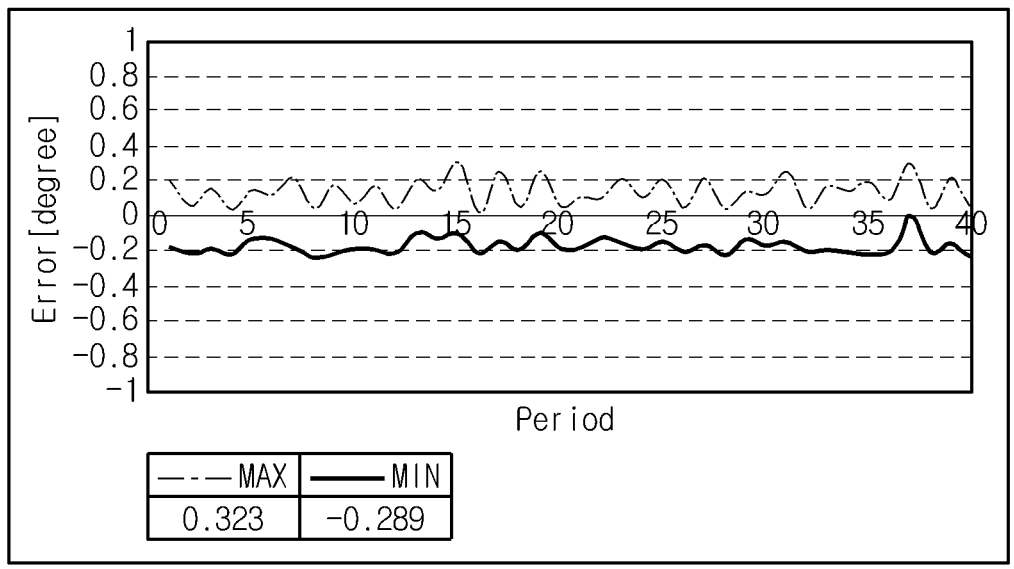
Figure 4E:
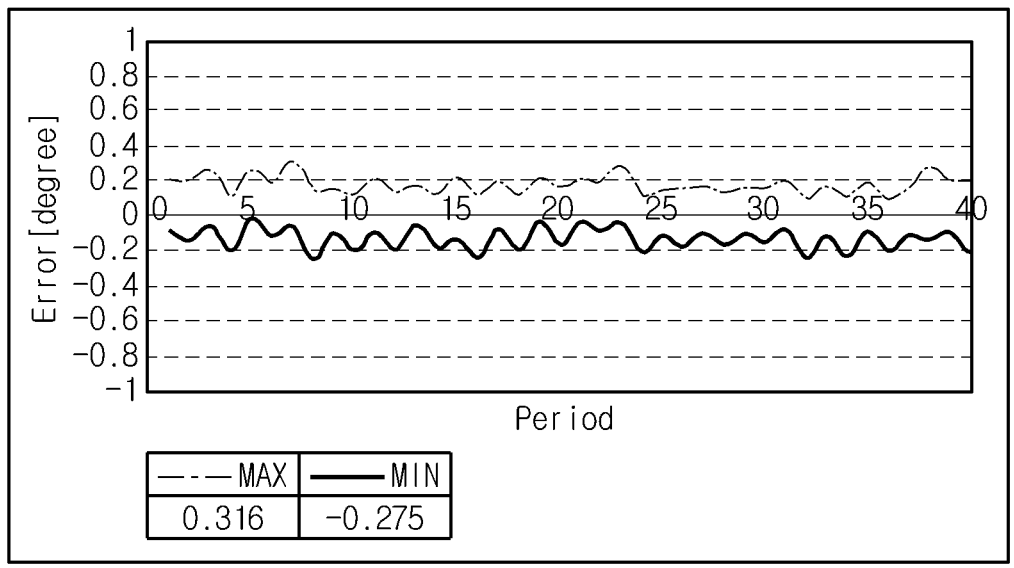
Figure 4E:
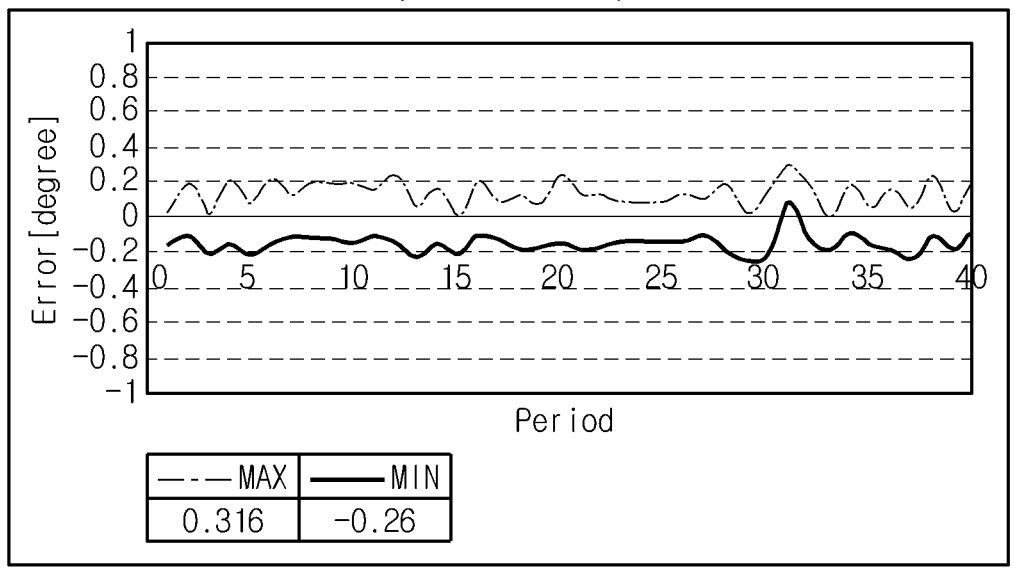

However, referring to FIGS. 4d and 4e, even though the width ratio (Wb/Wr) greatly increases to 2, 4 and 8 (Case 07, Case 08, Case 09), the maximum measurement error is just slightly improved to 0.329°, 0.323° and 0.316°. In particular, if the width ratio (Wb/Wr) exceeds 8 and reaches 12 (Case 10), it may be found that the maximum measurement error is not changed at 0.316° even though the width ratio (Wb/Wr) greatly increases. In other words, if the width ratio (Wb/Wr) is 1 or above, the width of the back yoke of the stator increases so that a size, weight, manufacture costs of the resolver increases as a whole, the measurement performance of the resolver is not greatly improved, which deteriorates product efficiency.

FIG. 5 is a table showing maximum measurement errors according to a width ratio (Wb/Wr) between the salient pole of the rotor and the back yoke of the stator. Here, the maximum measurement error represents a greatest absolute value of the measurement error which varies according to a rotation of the rotor.

Referring to FIG. 5, if the ratio (Wb/Wr) of the width of the back yoke to the width of the salient pole increases from 0.6 to 12, the maximum measurement error of the resolver gradually decreases. In particular, if the width ratio (Wb/Wr) becomes 0.66 or above, the maximum measurement error decreases to 0.5° or below, which satisfies an aimed allowable error range. In addition, if the width ratio (Wb/Wr) reaches 0.72 or above, the maximum measurement error decreases to 0.35° or below, which allows high precision of the resolver. However, if the width ratio (Wb/Wr) increases in excess of 1, it may be found that a decreasing rate of the maximum measurement error becomes gentler. In particular, if the width ratio (Wb/Wr) exceeds 8, the maximum measurement error does not substantially decrease. In this case, it may be understood that in relation to the measurement precision of the resolver, the width ratio (Wb/Wr) of the back yoke to the salient pole does not give a great influence on the measurement performance of the resolver in comparison to other factors.

As described above, according to the present disclosure, since a ratio relation between a width of a back yoke of a stator and a salient pole of a rotor is optimized in a resolver, it is possible to prevent overcrowded magnetic flux or magnetic saturation at the resolver, improve measurement precision and reduce manufacture costs without unnecessarily increasing a size or weight of the resolver. In addition, since a width of the back yoke of the stator and a width of the salient pole of the rotor are considered as a kind of parameter and a numerical range for optimizing a width ratio between them is provided to be reflected on the design of the resolver, it is possible to facilitate a design work for the resolver and prevent a design error. Further, it would be obviously understood from the following description by those skilled in the art that the embodiments according to the present disclosure can also solve various technical objects not mentioned above.

Heretofore, the embodiments of the present disclosure have been described in detail. However, it will be clearly understood by those skilled in the art that various modifications can be made within the scope of the present disclosure. Therefore, the embodiments should not be interpreted restrictively but illustrative. In other words, the true scope of the present disclosure is defined in the appended claims, and its equivalents and modifications should be entirely considered as falling within the scope of the present disclosure.

What is claimed is:

1. A resolver, comprising a stator having at least one excitation coil and at least one output coil, and a rotor disposed at a center space in the stator with a predetermined gap from the stator, the rotor rotating based on a rotary shaft to change a gap permeance with respect to the stator, wherein the stator includes a back yoke having a ring-shaped body, and a plurality of teeth formed at an inner circumference of the back yoke so that the excitation coil and the output coil are wound thereon, wherein the rotor includes a ring-shaped body having a center hole into which the rotary shaft is inserted, and a plurality of salient poles formed at an outer circumference of the ring-shaped body, and wherein the back yoke of the stator and the salient pole of the rotor have a relation satisfying Equation 1 below:

$$Wb \geq 0.66 \times Wr \qquad \text{Equation 1}$$

where Wb represents a width of the back yoke, and Wr represents a width of the salient pole, which is a distance from a peak point of the salient pole to the center hole.

2. The resolver according to claim 1, wherein the back yoke of the stator and the salient pole of the rotor have a relation satisfying Equation 2 below:

$$0.66 \times Wr \leq Wb \leq 8 \times Wr \qquad \text{Equation 2}$$

where Wb represents a width of the back yoke, and Wr represents a width of the salient pole, which is a distance from the peak point of the salient pole to the center hole.

3. The resolver according to claim 1, wherein the rotor or the stator is a steel plate laminate formed by laminating magnetic steel plates of a predetermined thickness.

4. The resolver according to claim 3, wherein the teeth of the stator respectively include a front end having a T shape, and a support portion protruding on the inner circumference of the back yoke to support the front end, the excitation coil or the output coil being wound on the support portion.

5. A resolver, comprising a stator having at least one excitation coil and at least one output coil, and a rotor disposed at a center space in the stator with a predetermined gap from the stator, the rotor rotating based on a rotary shaft to change a gap permeance with respect to the stator, wherein the stator includes a back yoke having a ring-shaped body, and a plurality of teeth formed at an inner circumference of the back yoke so that the excitation coil and the output coil are wound thereon, wherein the rotor includes a ring-shaped body having a center hole into which the rotary shaft is inserted, and a plurality of salient poles formed at an outer circumference of the ring-shaped body, and wherein the back yoke of the stator and the salient pole of the rotor have a relation satisfying Equation 3 below:

$$Wb \geq 0.72 \times Wr \qquad \text{Equation 3}$$

where Wb represents a width of the back yoke, and Wr represents a width of the salient pole, which is a distance from a peak point of the salient pole to the center hole.

6. The resolver according to claim 5, wherein the back yoke of the stator and the salient pole of the rotor have a relation satisfying Equation 4 below:

$$0.72 \times Wr \leq Wb \leq 1 \times Wr \qquad \text{Equation 4}$$

where Wb represents a width of the back yoke, and Wr represents a width of the salient pole, which is a distance from the peak point of the salient pole to the center hole.

7. The resolver according to claim 5, wherein the rotor or the stator is a steel plate laminate formed by laminating magnetic steel plates of a predetermined thickness.

8. The resolver according to claim 7, wherein the teeth of the stator respectively include a front end having a T shape, and a support portion protruding on the inner circumference of the back yoke to support the front end, the excitation coil or the output coil being wound on the support portion.

* * * * *